United States Patent [19]
Kuroda et al.

[11] Patent Number: 5,815,472
[45] Date of Patent: Sep. 29, 1998

[54] INFORMATION RECORDING METHOD AND APPARATUS

[75] Inventors: Kazuo Kuroda; Toshiro Tanikawa, both of Tokorozawa, Japan

[73] Assignee: Pioneer Electronic Corporation, Tokyo, Japan

[21] Appl. No.: 915,649

[22] Filed: Aug. 20, 1997

[30] Foreign Application Priority Data

Aug. 22, 1996 [JP] Japan ..................................... 8-221587

[51] Int. Cl.⁶ .............................. G11B 17/22; G11B 7/00
[52] U.S. Cl. .................................. 369/32; 369/47; 369/58
[58] Field of Search .................................. 369/32, 47, 54, 369/58, 124, 50, 59, 53, 44.32, 44.25; 360/69, 15

[56] References Cited

U.S. PATENT DOCUMENTS 5,619,483   4/1997   Yokota et al. .............................. 369/47
5,668,789   9/1997   Yokota et al. .............................. 369/47

*Primary Examiner*—Ali Neyzari
*Attorney, Agent, or Firm*—Morgan, Lewis & Bockius LLP

[57] ABSTRACT

An information recording method with: a buffering process for temporarily storing information, which is inputted from the external and is to be recorded, in a buffer memory; a generating process for reading out the temporarily stored information from the buffer memory, and applying a predetermined signal process onto the read out information to generate processed information comprising a plurality of record units; a recording process of recording the processed information onto an information record medium; a detecting process of detecting a storage amount of the temporarily stored information in the buffer memory; a stop controlling process of controlling the recording process to stop recording the processed information within a presently-recorded record unit among the record units, which includes the processed information which is being recorded by the recording process, when the detected storage amount becomes less than a predetermined value; and a re-start controlling process of controlling the recording process to re-start recording the processed information onto the information record medium from one of the record units, which includes the processed information to be recorded prior in time sequence to the presently-recorded record unit, or which is identical with the presently-recorded record unit, when the detected storage amount becomes more than the predetermined value.

14 Claims, 5 Drawing Sheets

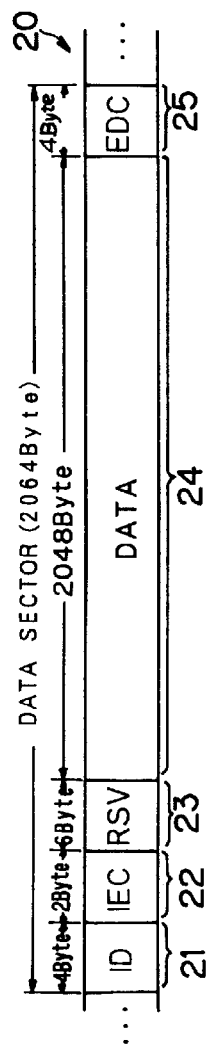
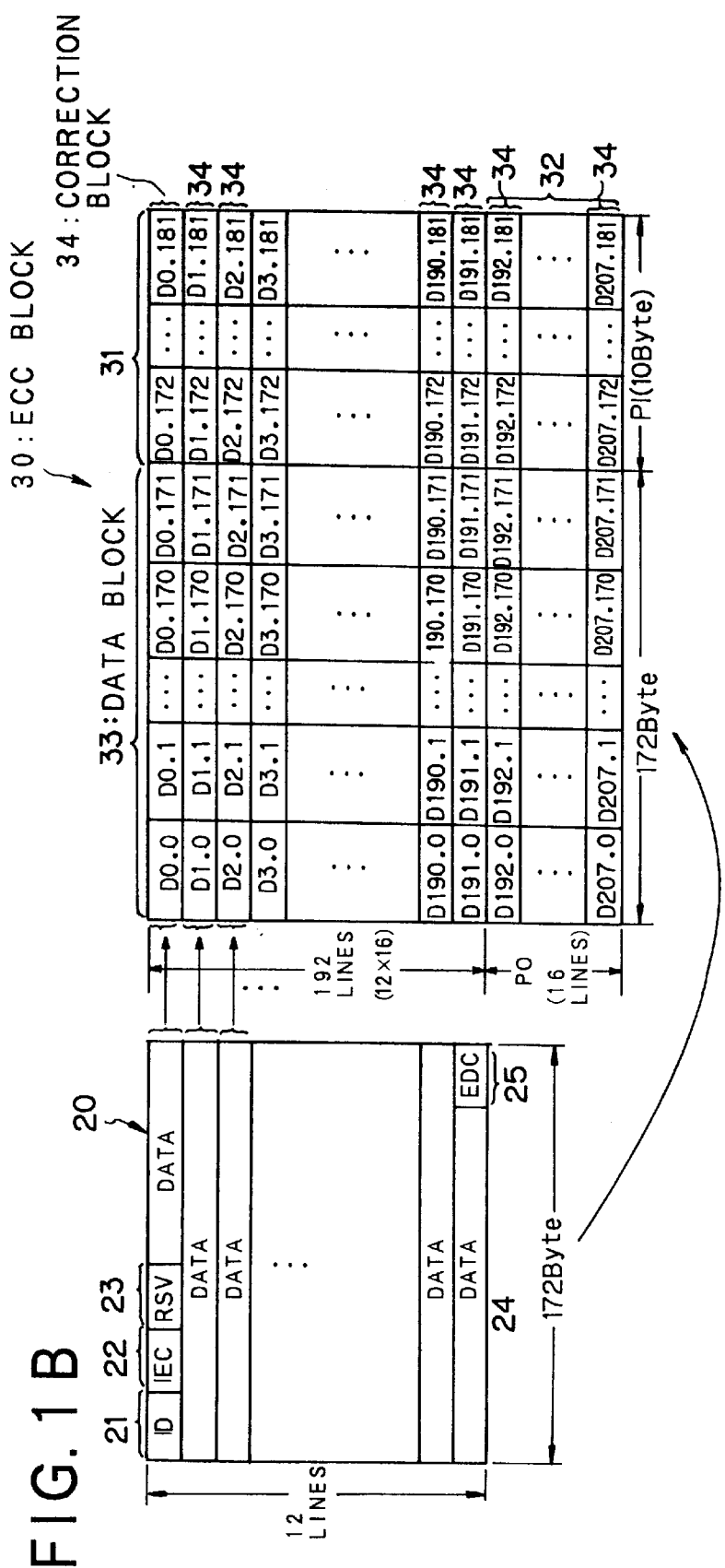
FIG. 1A
FIG. 1B

INFORMATION RECORDING METHOD AND APPARATUS

BACKGROUND OF THE INVENTION

1. Field of the Invention

The present invention is related with an information recording method and apparatus for recording record information onto an information record medium of write-once-read-many type, such as a high-density optical disc and the like, which is used as an external storage device for a host computer and is represented by a DVD-R (DVD-Recordable) on which the information can be recorded only once.

2. Description of the Related Art

This type of information recording apparatus performs an operation of recording various data inputted from a host computer onto an information record medium of write-once-read-many type (hereinbelow, it is referred to as a "DVD-R etc."), which is recordable only once, under the control of the host computer. At the time of this recording operation, the transfer rate, at which the data is transferred from the host computer to the information recording apparatus, and the record rate, at which the transferred data is recorded by the information recording apparatus onto the DVD-R etc., are hardly coincident with each other. The transfer rate from the host computer is often set to be higher than the record rate.

Therefore, as a method of canceling or compensating the difference between the transfer rate and the record rate, there is a method of canceling or compensating this rate difference, by equipping a buffer memory to the information recording apparatus, storing the transferred data at the transfer rate temporarily in the buffer memory, and reading the stored data at the rate corresponding to the record rate.

By the way, in the information recording apparatus equipped with this buffer memory, the balance between the data amount read from the buffer memory and the data amount written into the buffer memory may be destroyed due to the difference between the transfer rate and the record rate. Namely, the data amount written into the buffer memory may become larger than the data amount read from the buffer memory, so that a condition may happen in which the storage amount of the data in the buffer memory is continuously increased. Thus, when the storage of the data in one segment which has been transferred is completed or finished, the processor for controlling the information recording apparatus transmits to the host computer a command to request for temporarily stopping the data transfer (hereinbelow, it is referred to as a "data transfer stopping command"), keeps to monitor the empty capacity of the recordable area in the buffer memory which increases while recording the data onto the DVD-R etc., and transmits to the host computer a command to request for transferring the data in the next segment from the host computer (hereinbelow, it is referred to as a "data transfer requesting command") when the monitored empty capacity becomes higher than a predetermined level. Then, when the new data is transferred and is accumulated in the buffer memory and the empty capacity in the buffer memory becomes "0" or less than a predetermined level, the data transfer stopping command is transmitted again to the host computer. Then, the host computer performs the data transfer control on the basis of the above described data transfer stopping command and the data transfer requesting command.

By the way, various peripheral apparatuses other than the information recording apparatus, such as a hard disc drive etc., may be connected to the host computer. Each of the operation speeds of these peripheral apparatuses are often lower than the operating speed of the host computer. Thus, in a so-called batch process in which the host computer performs one process for one peripheral apparatus and changes over to another process after the one process is completed or finished, a priority order may be set by the host computer with respect to each of the processes for the peripheral apparatuses, and each of the processes for the peripheral apparatuses may be performed in a time divisional manner on the basis of the priority orders, in order to improve the utilization efficiency of the host computer.

At this time, it is normal that, as the process is more closely related with a so-called "man-machine-interface" which is directly related to the user of the host computer, the priority order thereof is set higher. Thus, even if the data transfer requesting command from the information recording apparatus is received by the host computer, the host computer may not immediately respond to this data transfer requesting command during the prosecution of the process for another peripheral apparatus, which has the higher priority order than the information recording apparatus. Namely, although the information recording apparatus performs recording the data onto the DVD-R etc., a condition may happen in which the data to be recorded is not stored or accumulated in the buffer memory of the information recording apparatus i.e., a so-called "under run" condition may happen in the information recording apparatus.

If this under run condition happens, the continuity of the data in the data reading operation from the buffer memory cannot be maintained. In this case, according to the conventional information recording apparatus for the DVD-R etc., the recording operation is temporarily stopped, and, after the under run condition is dissolved, new data in each predetermined segment is recorded again, which includes the data which has been already recorded, onto the DVD-R etc. at a new recordable area thereof.

However, in the information recording apparatus for the DVD-R etc., since the data which has been once recorded cannot be erased anymore, the recordable area on the DVD-R etc., where the data has been once recorded when the under run condition happens, becomes an unavailable area at which the data is not continuous and which will be jumped when the DVD-R etc. is reproduced later. Therefore, this unavailable area is really inefficient in the DVD-R etc. on which the data in large amount is to be recorded, and the recordable area of the DVD-R etc. cannot be utilized efficiently, which is a problem.

Further, in case that the data which continuity is not maintained exists as it is on the DVD-R etc., an error operation may be caused at the time of reproduction, which is another problem.

SUMMARY OF THE INVENTION

The present invention is proposed from the viewpoint of the above mentioned problems. It is therefore an object of the present invention to provide an information recording method and apparatus, which can record the data such that, even in case that the under run condition happens, the recordable area of the DVD-R etc. is not wasted, and the data can be precisely reproduced at the time of reproduction.

The above object of the present invention can be achieved by an information recording method provided with: a buffering process for temporarily storing information, which is inputted from the external and is to be recorded, in a buffer memory; a generating process for reading out the temporarily stored information from the buffer memory, and applying a predetermined signal process, such as an interleave process, an 8–16 modulation process or the like, onto the read out information to generate processed information comprising a plurality of record units, such as a sync frame or the like; a recording process of recording the processed information onto an information record medium, such as a DVD-R or the like; a detecting process of detecting a storage amount of the temporarily stored information in the buffer memory; a stop controlling process of controlling the recording process to stop recording the processed information within a presently-recorded record unit among the record units, which includes the processed information which is being recorded by the recording process, when the detected storage amount becomes less than a predetermined value; and a re-start controlling process of controlling the recording process to re-start recording the processed information onto the information record medium from one of the record units, which includes the processed information to be recorded prior in time sequence to the presently-recorded record unit, or which is identical with the presently-recorded record unit, when the detected storage amount becomes more than the predetermined value.

According to the information recording method of the present invention, the storage amount of the temporarily stored information in the buffer memory is detected by the detecting process. When the detected storage amount becomes less than the predetermined value, the recording process stops recording the processed information within the presently-recorded record unit, which includes the processed information which is being recorded by the recording process, under the control of the stop controlling process. After that, when the detected storage amount becomes more than the predetermined value, the recording process re-starts recording the processed information onto the information record medium from one of the record units, which includes the processed information to be recorded prior in time sequence to the presently-recorded record unit, or which is identical with the presently-recorded record unit, under the control of the re-start controlling process.

Therefore, even if the storage amount in the buffer memory certainly decreases due to a generation of a discontinuity in the information before recording, the continuity of the processed information can be secured at the time of reproducing the processed information, which has been recorded on the information record medium, so that a precise reproduction is enabled.

Further, since the processed information can be recorded continuously on the information record medium, the recordable area on the information record medium is not wasted.

Consequently, the recording and reproducing operations can be precisely and certainly performed while efficiently utilizing the recordable area of the information record medium, such as a DVD-R or the like, according to the present invention.

In one aspect of the information recording method of the present invention, the stop controlling process includes a record unit storing process of storing the presently-recorded record unit, and the re-start controlling process controls the recording process to re-start recording the processed information from one of the record units, which includes the processed information to be recorded prior in time sequence to the presently-recorded record unit stored by the record unit storing process, or which is identical with the presently-recorded record unit stored by the record unit storing process.

According to this aspect, the presently-recorded record unit is stored by the record unit storing process. Then, the recording process re-starts recording the processed information from one of the record units, which includes the processed information to be recorded prior in time sequence to the presently-recorded record unit stored by the record unit storing process, or which is identical with the presently-recorded record unit stored by the record unit storing process, under the control of the re-start controlling process.

Therefore, the continuity of the processed information can be surely secured at the time of reproducing the processed information, which has been recorded on the information record medium, so that a precise reproduction is enabled.

In another aspect of the information recording method of the present invention, the processed information is divided into a plurality of error correction units, such as ECC blocks or the like, which are set in advance, the stop controlling process controls the recording process to stop recording the processed information within a second record unit from a head of each of the error correction units among the record units included in each of the error correction units, as the presently-recorded record unit, and the re-start controlling process controls the recording process to re-start recording the processed information onto the information record medium from a head of the presently-recorded record unit.

According to this aspect, the recording process stops recording the processed information within the second record unit from the head of each of the error correction units among the record units included in each of the error correction units, as the presently-recorded record unit, under the control of the stop controlling process. Then, the recording process re-starts recording the processed information onto the information record medium from the head of the presently-recorded record unit, under the control of the re-start controlling process.

Therefore, the recording operation can be re-started within one record unit, so that the recordable area on the information record medium can be even more efficiently utilized.

Further, since the area where the processed information is overwritten is only within the presently-recorded record unit, it is easy to perform an error correction process at the time of reproducing the processed information.

In another aspect of the information recording method of the present invention, the information is inputted into the buffer memory from an external computer apparatus, such as a host computer or the like.

According to this aspect, since the information is inputted from the external computer apparatus, in case that the input of the information is ceased due to a failure etc. of the external computer apparatus and that the generation of the processed information is ceased in due course, the processed information can be still recorded continuously on the information record medium.

In this aspect, the stop controlling process may include an error signal transmitting process of transmitting an error signal, which indicates an error condition in the external computer apparatus, to the external computer apparatus when the detected storage amount remains less than the predetermined value after the recording process stops recording the processed information.

According to this case, after the recording process stops recording the processed information, when the detected storage amount remains less than the predetermined value, the error signal is transmitted to the external computer apparatus by the error signal transmitting process. Thus, it is possible to inform the external computer apparatus that it is in the error condition.

In this aspect also, the information recording method may be further provided with a stop command outputting process of outputting to the external computer apparatus a data transfer stop command to stop a transmission of the information to the buffer memory, when the detected storage amount becomes a predetermined full level of the buffer memory.

According to this case, when the detected storage amount becomes the predetermined full level of the buffer memory, the data transfer stop command to stop the transmission of the information to the buffer memory is outputted to the external computer apparatus, by the stop command outputting process. Thus, it is possible to prevent the buffer memory from becoming in the memory full condition.

In this aspect also, the information recording method may be further provided with a request command outputting process of outputting to the external computer apparatus a data transfer request command to request a transmission of the information to the buffer memory, when the detected storage amount becomes a predetermined storable level of the buffer memory.

According to this case, when the detected storage amount becomes the predetermined storable level of the buffer memory, the data transfer request command to request the transmission of the information to the buffer memory is outputted to the external computer apparatus, by the request command outputting process. Thus, it is possible to efficiently utilize the buffer memory during the recording operation.

The above object of the present invention can be also achieved by an information recording apparatus provided with: a buffer memory for temporarily storing information, which is inputted from the external and is to be recorded; a generating device for reading out the temporarily stored information from the buffer memory, and applying a predetermined signal process onto the read out information to generate processed information comprising a plurality of record units; a recording device for recording the processed information onto an information record medium; a detecting device for detecting a storage amount of the temporarily stored information in the buffer memory; a stop controlling device for controlling the recording device to stop recording the processed information within a presently-recorded record unit among the record units, which includes the processed information which is being recorded by the recording device, when the detected storage amount becomes less than a predetermined value; and a re-start controlling device for controlling the recording device to re-start recording the processed information onto the information record medium from one of the record units, which includes the processed information to be recorded prior in time sequence to the presently-recorded record unit, or which is identical with the presently-recorded record unit, when the detected storage amount becomes more than the predetermined value.

According to the information recording apparatus of the present invention, the storage amount of the temporarily stored information in the buffer memory is detected by the detecting device. When the detected storage amount becomes less than the predetermined value, the recording device stops recording the processed information within the presently-recorded record unit, which includes the processed information which is being recorded by the recording device, under the control of the stop controlling device.

After that, when the detected storage amount becomes more than the predetermined value, the recording device re-starts recording the processed information onto the information record medium from one of the record units, which includes the processed information to be recorded prior in time sequence to the presently-recorded record unit, or which is identical with the presently-recorded record unit, under the control of the re-start controlling device.

Therefore, even if the storage amount in the buffer memory certainly decreases due to a generation of a discontinuity in the information before recording, the continuity of the processed information can be secured at the time of reproducing the processed information, which has been recorded on the information record medium, so that a precise reproduction is enabled.

Further, since the processed information can be recorded continuously on the information record medium, the recordable area on the information record medium is not wasted.

Consequently, the recording and reproducing operations can be precisely and certainly performed while efficiently utilizing the recordable area of the information record medium, such as a DVD-R or the like, according to the present invention.

In one aspect of the information recording apparatus of the present invention, the stop controlling device includes a record unit storing device for storing the presently-recorded record unit, and the re-start controlling device controls the recording device to re-start recording the processed information from one of the record units, which includes the processed information to be recorded prior in time sequence to the presently-recorded record unit stored by the record unit storing device, or which is identical with the presently-recorded record unit stored by the record unit storing device.

According to this aspect, the presently-recorded record unit is stored by the record unit storing device. Then, the recording device re-starts recording the processed information from one of the record units, which includes the processed information to be recorded prior in time sequence to the presently-recorded record unit stored by the record unit storing device, or which is identical with the presently-recorded record unit stored by the record unit storing device, under the control of the re-start controlling device.

Therefore, the continuity of the processed information can be surely secured at the time of reproducing the processed information, which has been recorded on the information record medium, so that a precise reproduction is enabled.

In another aspect of the information recording apparatus of the present invention, the processed information is divided into a plurality of error correction units which are set in advance, the stop controlling device controls the recording device to stop recording the processed information within a second record unit from a head of each of the error correction units among the record units included in each of the error correction units, as the presently-recorded record unit, and the re-start controlling device controls the recording device to re-start recording the processed information onto the information record medium from a head of the presently-recorded record unit.

According to this aspect, the recording device stops recording the processed information within the second record unit from the head of each of the error correction units among the record units included in each of the error correction units, as the presently-recorded record unit, under the control of the stop controlling device. Then, the recording device re-starts recording the processed information onto the information record medium from the head of the presently-recorded record unit, under the control of the re-start controlling device.

Therefore, the recording operation can be re-started within one record unit, so that the recordable area on the information record medium can be even more efficiently utilized.

Further, since the area where the processed information is overwritten is only within the presently-recorded record unit, it is easy to perform an error correction process at the time of reproducing the processed information.

In another aspect of the information recording apparatus of the present invention, the information is inputted into the buffer memory from an external computer apparatus.

According to this aspect, since the information is inputted from the external computer apparatus, in case that the input of the information is ceased due to a failure etc. of the external computer apparatus and that the generation of the processed information is ceased in due course, the processed information can be still recorded continuously on the information record medium.

In this aspect, the stop controlling device may include an error signal transmitting device for transmitting an error signal, which indicates an error condition in the external computer apparatus, to the external computer apparatus when the detected storage amount remains less than the predetermined value after the recording device stops recording the processed information.

According to this case, after the recording device stops recording the processed information, when the detected storage amount remains less than the predetermined value, the error signal is transmitted to the external computer apparatus by the error signal transmitting device. Thus, it is possible to inform the external computer apparatus that it is in the error condition.

In this aspect also, the information recording apparatus may be further provided with a stop command outputting device for outputting to the external computer apparatus a data transfer stop command to stop a transmission of the information to the buffer memory, when the detected storage amount becomes a predetermined full level of the buffer memory.

According to this case, when the detected storage amount becomes the predetermined full level of the buffer memory, the data transfer stop command to stop the transmission of the information to the buffer memory is outputted to the external computer apparatus, by the stop command outputting device. Thus, it is possible to prevent the buffer memory from becoming in the memory full condition.

In this aspect also, the information recording apparatus may be further provided with a request command outputting device for outputting to the external computer apparatus a data transfer request command to request a transmission of the information to the buffer memory, when the detected storage amount becomes a predetermined storable level of the buffer memory.

According to this case, when the detected storage amount becomes the predetermined storable level of the buffer memory, the data transfer request command to request the transmission of the information to the buffer memory is outputted to the external computer apparatus, by the request command outputting device. Thus, it is possible to efficiently utilize the buffer memory during the recording operation.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1A is a diagram showing a data structure of record information in an embodiment;

FIG. 1B is a diagram showing a configuration of an ECC block in the record information in the embodiment;

DETAILED DESCRIPTION OF THE PREFERRED EMBODIMENT

Figure 2:
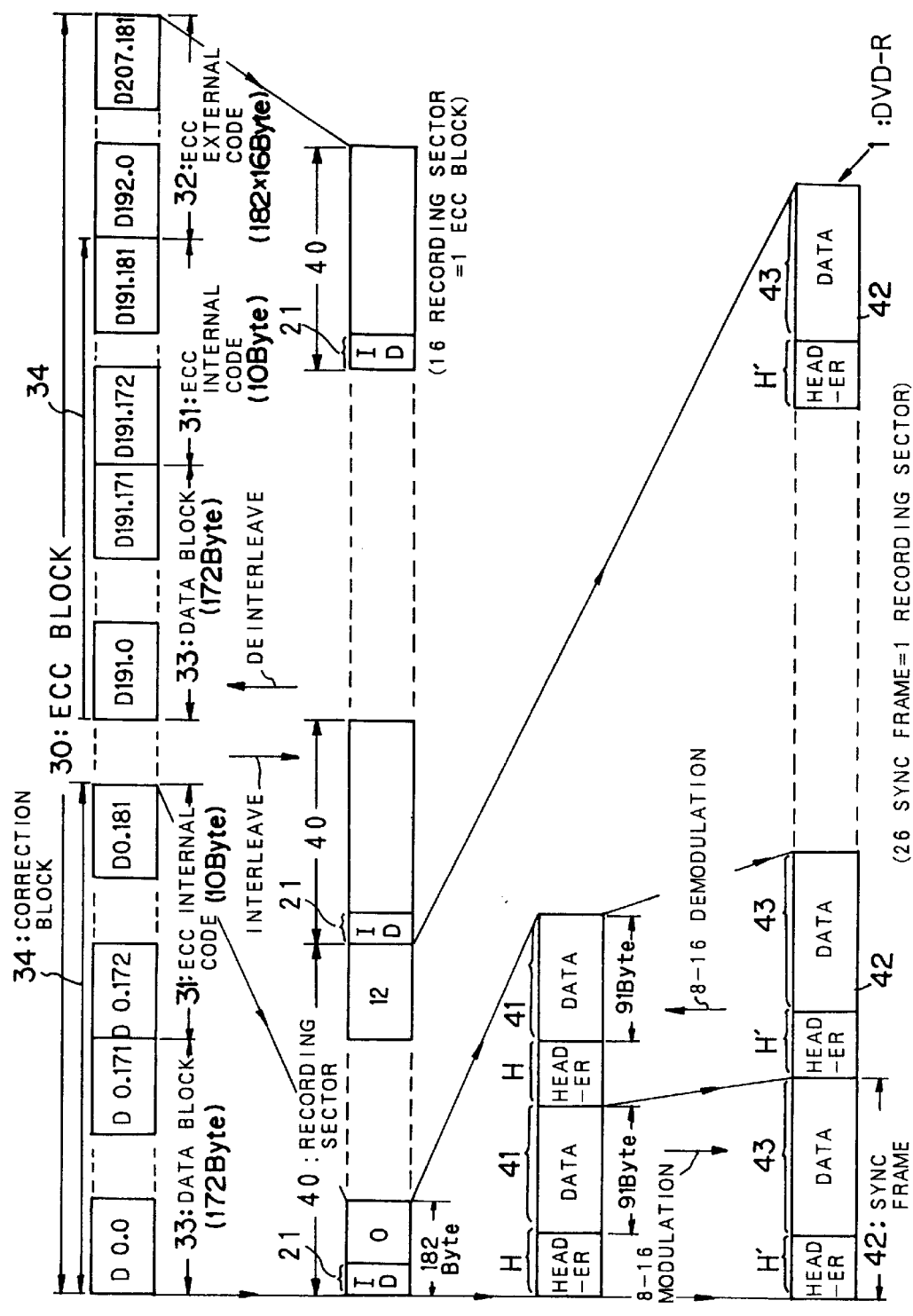
FIG. 2 is a diagram showing a physical format of the record information in the embodiment.

Next, a preferred embodiment of the present invention will be explained with reference to the accompanied drawings. In the following explanations, the present invention is applied to an information recording apparatus for recording record information onto a DVD-R as an embodiment of the present invention.

(I) Record Format

At first, a physical format of the record information on the DVD-R and an error correcting process for the record information are explained with reference to FIGS. 1 and 2.

The error correcting process for the DVD-R and an ECC block, which serves as an error correction unit in the error correcting process in the embodiment, are firstly explained with reference to FIGS. 1A and 1B.

As shown in FIG. 1A, the record information recorded on the DVD-R has a physical structure including a plurality of data sectors 20. One data sector 20 is composed, in an order from a head portion thereof, of: an ID information (ID) 21 indicative of a start position of the data sector 20; an ID information error correction code (IEC) 22 for correcting errors in the ID information 21; reserve data (RSV) 23; data 24 which is the main data to be recorded; and an error detection code (EDC) 25 for detecting errors in the data 24. The record information to be recorded is constituted by a plurality of the data sectors 20 arranged in sequence.

Next, a process in an encoder described later for constituting the ECC block by the data sectors 20 is explained with reference to FIG. 1B.

As shown in FIG. 1B, when constituting an ECC block 30 by the data sectors 20, one data sector 20 is firstly divided into a plurality of blocks, each of which is 172 bytes data, and each divided data (hereinafter, it is referred to as a "data block 33") is arranged in a vertical direction (refer to the left side of FIG. 1B). At this time, the data blocks 33 are arranged in 12 lines in the vertical direction.

For each data block 33 arranged in the vertical direction, an ECC internal code (PI (Parity In) sign) 31 having 10 bytes data is affixed to the end of the data block 33 to constitute one correction block 34 (refer to right side of FIG. 1B). At this stage, the correction blocks 34 to which the ECC internal codes 31 are affixed are arranged in 12 lines in the vertical direction. After that, this process is repeated with respect to 16 data sectors 20. Accordingly, the correction blocks 34 of 192 (=12×16) lines are obtained.

Next, the correction blocks 34 of 192 lines are divided for each one byte in the vertical direction from the beginning thereof, in the state that the 192 lines of the correction blocks 34 are arranged in the vertical direction. Then, 16 ECC external codes (PO (Parity Out) signs) 32 are affixed to each of the vertically divided data blocks. It is noted that the ECC external code 32 is also affixed to a portion of the ECC internal code 31 within the correction block 34.

From the above mentioned process, one ECC block 30 including 16 data sectors 20 is produced as shown in FIG. 1B (the right side). At this time, a total amount of the information included within one ECC block 30 is expressed by an equation described below.

$$(172+10) \text{ bytes} \times (192+16) \text{ lines} = 37856 \text{ bytes}$$

The actual data 24 (i.e., other than the ECC codes) in it is expressed by an equation described below.

$$2048 \text{ bytes} \times 16 = 32768 \text{ bytes}$$

In the ECC block 30 shown in FIG. 1B, data of one byte is indicated by [D#. *]. For example, [D1. 0] indicates the data of one byte positioned at a first line and a zeroth column, and [D190. 170] indicates the data of one byte positioned at a 190th line and a 170th column. Thus, the ECC internal codes 31 are positioned at 172nd to 181st columns respectively, and the ECC external codes 32 are positioned at 192nd to 207th lines respectively.

The correction blocks 34 are consecutively recorded on the DVD-R.

The reason why the ECC block 30 is constituted so as to include both of the ECC internal code 31 and the ECC external code 32, as shown in the right side of FIG. 1B, is that the data arranged in the horizontal direction in FIG. 1B is corrected by the ECC internal code 31 and the data arranged in the vertical direction is corrected by the ECC external code 32. That is, it is possible to perform the error correction in both of the horizontal and vertical directions within the ECC block 30 shown in FIG. 1B.

More concretely, for example, even if a certain one of the correction blocks 34 (which are, as mentioned above, consecutively recorded on the DVD-R and each of which has the data of 182 bytes in total including the ECC internal codes 31 for one line) is entirely destroyed by a scratch or the like existing on the DVD-R, it is merely the one-byte data destruction with respect to the ECC external codes 32 at one column, as viewed in the vertical direction. Thus, by carrying out the error correction using the ECC external codes 32 at each column, it is possible to appropriately carry out the error correction to correctly reproduce the original information from the destroyed information, even though one correction block 34 is entirely destroyed.

The manner of actually recording onto the DVD-R the data sectors 20 included in the ECC blocks 30 shown in FIG. 1B is explained with reference to FIG. 2. In FIG. 2, the data indicated in [D#. *] corresponds to the data described in the right side of FIG. 1B. Incidentally, processes at the time of recording the data sector 20 in FIG. 2 (i.e. an interleave process and an 8–16 modulation process) are processes performed by the encoder described later.

At the time of recording the ECC blocks 30 onto the DVD-R, the ECC blocks 30 are firstly aligned along one line in a horizontal direction for each correction block 34, as shown in a top stage of FIG. 2, and then are interleaved to be divided into 16 recording sectors 40 (as shown in a second top stage of FIG. 2). At this time, one recording sector 40 includes information of 2366 bytes (=37856 bytes/16), and that the data sectors 20, the ECC internal codes 31 and the ECC external codes 32 are intermingled and included in each recording sector 40. However, the ID information 21 (refer to FIG. 1A) in the data sector 20 is positioned at a head portion of each recording sector 40.

The recording sector 40 is divided into a plurality of data 41 each having 91 bytes, and a header H is appended to each data 41 (as shown in a third top stage of FIG. 2). After that, one sync frame 42 is produced from one data 41 by 8–16-modulating the recording sector 40 including the pairs of the header H and the data 41. At this time, one sync frame 42 is composed of a header H' and data 43 (as shown in a bottom stage of FIG. 2). Further, an information amount within one sync frame 42 is expressed by an equation described below.

$$91 \text{ bytes} \times 8 \times (16/8) = 1456 \text{ bytes}$$

Then, the information is written onto a DVD-R 1 in a form of the continuous sync frames 42. At this time, one recording sector 40 includes 26 sync frames 42.

By constituting the above explained physical format and recording the record information onto the DVD-R, the 8–16-demodulation and de-interleave (refer to FIG. 2) are performed at the time of reproducing the recorded information to thereby reproduce the original ECC block 30 while performing the effective error correction to accurately reproduce the record information.

(II) Information Recording Apparatus

Next, an information recording apparatus as an embodiment of the present invention for recording the record information onto the DVD-R 1 according to the physical format explained with reference to FIGS. 1A to 2 is explained with reference to FIGS. 3 to 5B. Here, the following assumptions are made in the embodiment described below. Namely, pre-pits or the like carrying address information on the DVD-R 1 are formed in advance on the information tracks, on which the record information is to be recorded, of the DVD-R 1. Then, at the time of recording the record information, the address information on the DVD-R 1 is obtained by detecting the pre-pits. By this, a record position on the DVD-R 1 where the record information is to be recorded is detected, so that the record information is recorded thereto.

A configuration of the information recording apparatus of the embodiment is firstly explained with reference to FIG. 3.

Figure 3:
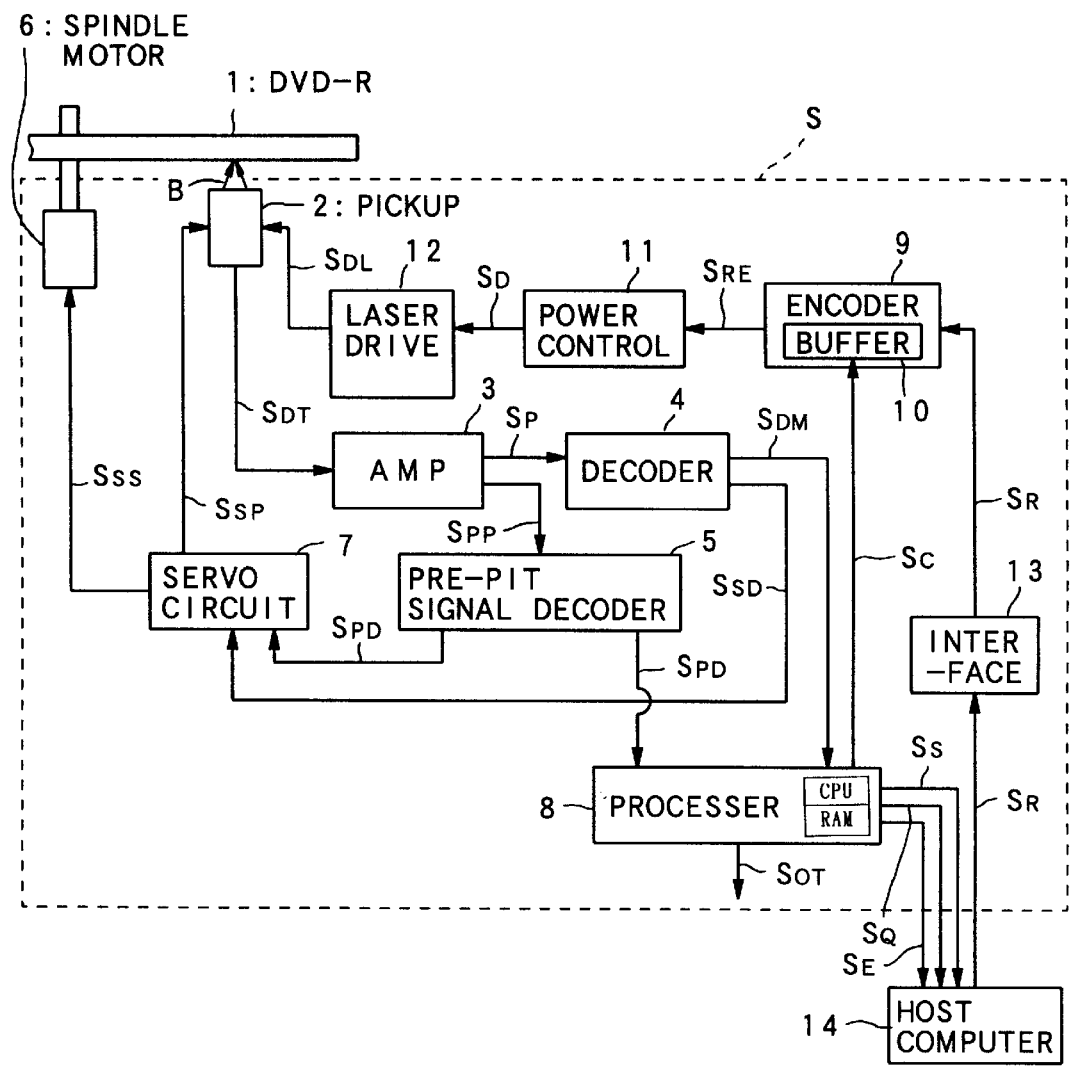
FIG. 3 is a block diagram showing a schematic configuration of an information recording apparatus according to the present invention.

As shown in FIG. 3, an information recording apparatus S of the embodiment is provided with: a pick-up 2; a reproduction amplifier (AMP) 3; a decoder 4; a pre-pit signal decoder 5; a spindle motor 6; a servo circuit 7; a processor (CPU) 8; an encoder 9; a power control circuit 11; a laser drive circuit 12; and an interface 13. To the information recording apparatus S, a record information signal $S_R$ indicating record information to be recorded is inputted through the interface 13 from an external host computer 14.

The encoder 9 is provided with a buffer memory 10.

Next, a whole operation is explained.

The pick-up 2 includes a laser diode, a deflection beam splitter, an objective lens, light detectors and the like (not shown), and irradiates a light beam B onto the information record surface of the DVD-R 1 on the basis of a laser drive signal $S_{DL}$, and detects the pre-pits on the basis of a reflected light thereof to thereby record an encode signal $S_{RE}$ described later. Moreover, in a case of the existence of old record information which has been already recorded, the pick-up 2 detects this old record information on the basis of the reflected light of the light beam B.

Then, the reproduction amplifier 3 amplifies a detection signal $S_{DT}$ including the information corresponding to the pre-pits (and the information corresponding to the old record information which has already been recorded, if it exists) outputted by the pick-up 2, and outputs a pre-pit signal $S_{PP}$ corresponding to the pre-pits (and an amplified signal $S_P$ corresponding to the old record information, if it exists).

After that, the decoder 4 applies the 8–16-demodulation and the de-interleave to the amplified signal $S_P$ to thereby decode the amplified signal $S_P$ and then outputs a demodulated signal $S_{DM}$ and a servo demodulated signal $S_{SD}$.

On the other hand, the pre-pit signal decoder 5 decodes the pre-pit signal $S_{PP}$ to thereby output a demodulated pre-pit signal $S_{PD}$.

Then, the servo circuit 7 outputs to the pick-up 2 a pick-up servo control signal $S_{SP}$ for focus servo control and tracking servo control in the pick-up 2, on the basis of the demodulated pre-pit signal $S_{PD}$ and the servo demodulated signal $S_{SD}$, and also outputs to the spindle motor 6 a spindle servo signal $S_{SS}$ for servo-controlling the rotation of the spindle motor 6 to rotate the DVD-R 1.

Along with this, the processor 8 outputs to the external a reproduction signal $S_{OT}$ corresponding to the old record information, which has been already recorded, on the basis of the demodulated signal $S_{DM}$, and further outputs a buffer control signal $S_C$ so as to control the recording operation described later.

On the other hand, the interface 13 performs an interface operation with respect to the record information signal $S_R$ transmitted from the host computer 14 so as to read it into the information recording apparatus S under the control of the processor 8, and outputs the record information signal $S_R$ to the encoder 9.

The encoder 9, which includes an ECC generator, an 8–16 modulator, a scrambler and the like (not shown in the figure) as well as the buffer memory 10, affixes the ECC internal code 31 and the ECC external code 32 to the record information signal $S_R$ to thereby constitute the ECC block 30, and applies the interleave process, the 8–16 modulation process and the scramble process to the ECC block 30 to thereby output the encode signal $S_{RE}$. At this time, the buffer memory 10 included in the encoder 9 temporarily stores the record information signal $S_R$ from the host computer 14 on the basis of the buffer control signal $S_C$ from the processor 8, and outputs the record information signal $S_R$ at a reading out rate corresponding to a recording rate for the encode signal $S_{RE}$ of the pick-up 2 with respect to the DVD-R 1.

More concretely, after the record information signal $S_R$ is temporarily stored in the buffer memory 10, the record information signal $S_R$ is read out from the buffer memory 10 under the control of the buffer control signal $S_C$, so that the generation process of the ECC block 30, the interleave process and so on are applied to this read out record information signal $S_R$ in the encoder 9 in the present embodiment.

Then, the power control circuit 11 outputs to the laser drive circuit 12 a drive signal $S_D$ to control an output of the laser diode (not shown) within the pick-up 2 on the basis of the encode signal $S_{RE}$.

After that, the laser drive circuit 12 outputs to the laser diode the laser drive signal $S_{DL}$ for actually driving the laser diode to emit the light beam B on the basis of the drive signal $S_D$.

Further, the information recording apparatus S may reproduce the information recorded on the DVD-R 1. In that case, the reproduction signal $S_{OT}$ is outputted to the external through the processor 8 on the basis of the demodulated signal $S_{DM}$.

(III) Information Recording Operation

Figure 4:
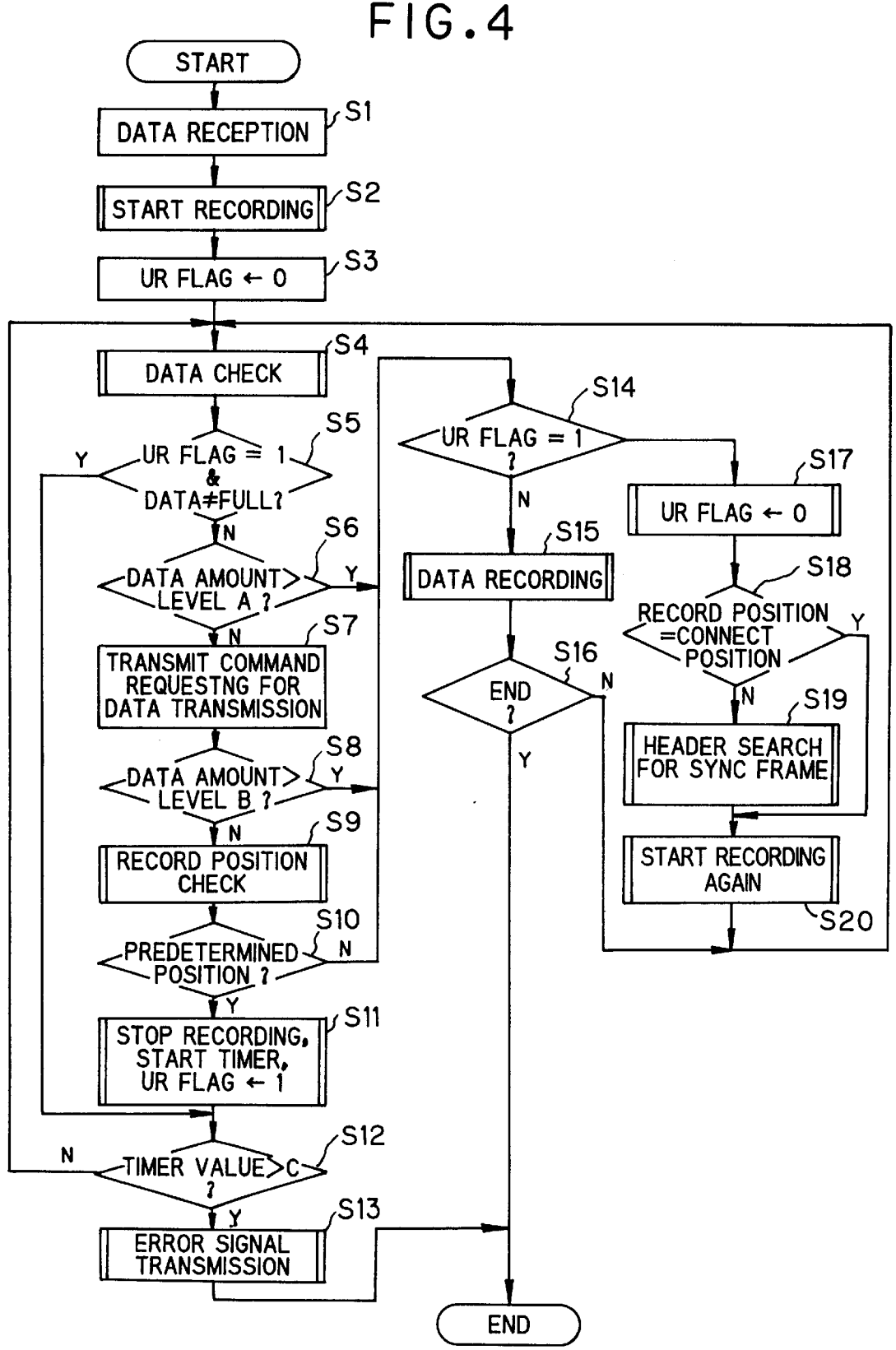
FIG. 4 is a flow chart showing an information recording operation of the embodiment.
Figure 5A:
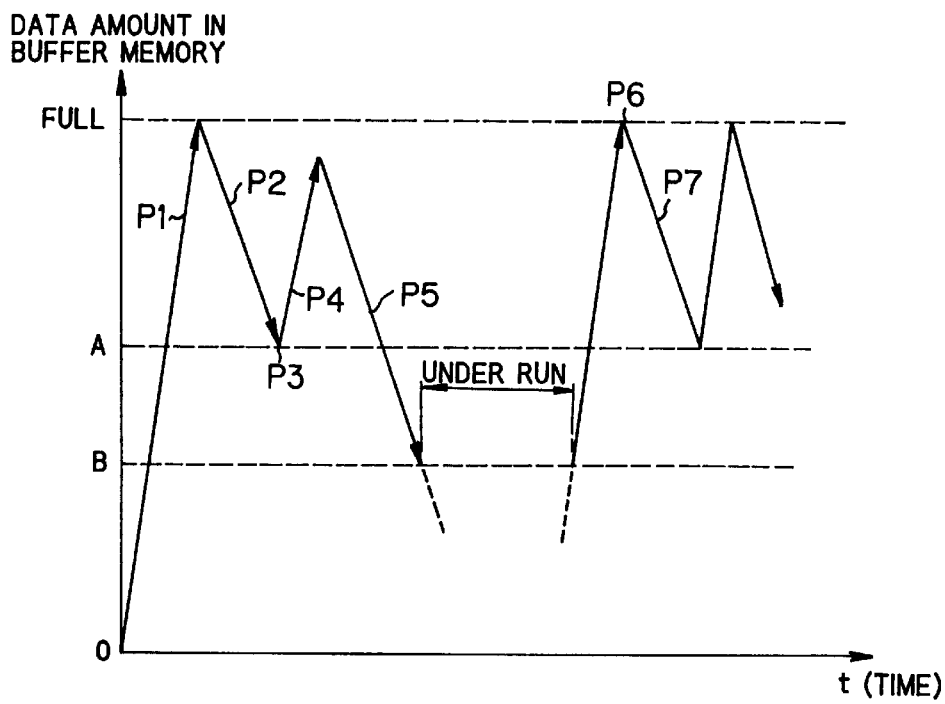
FIG. 5A is a diagram showing a transition of the data amount in a buffer memory during the information recording operation in the embodiment.
Figure 5B:
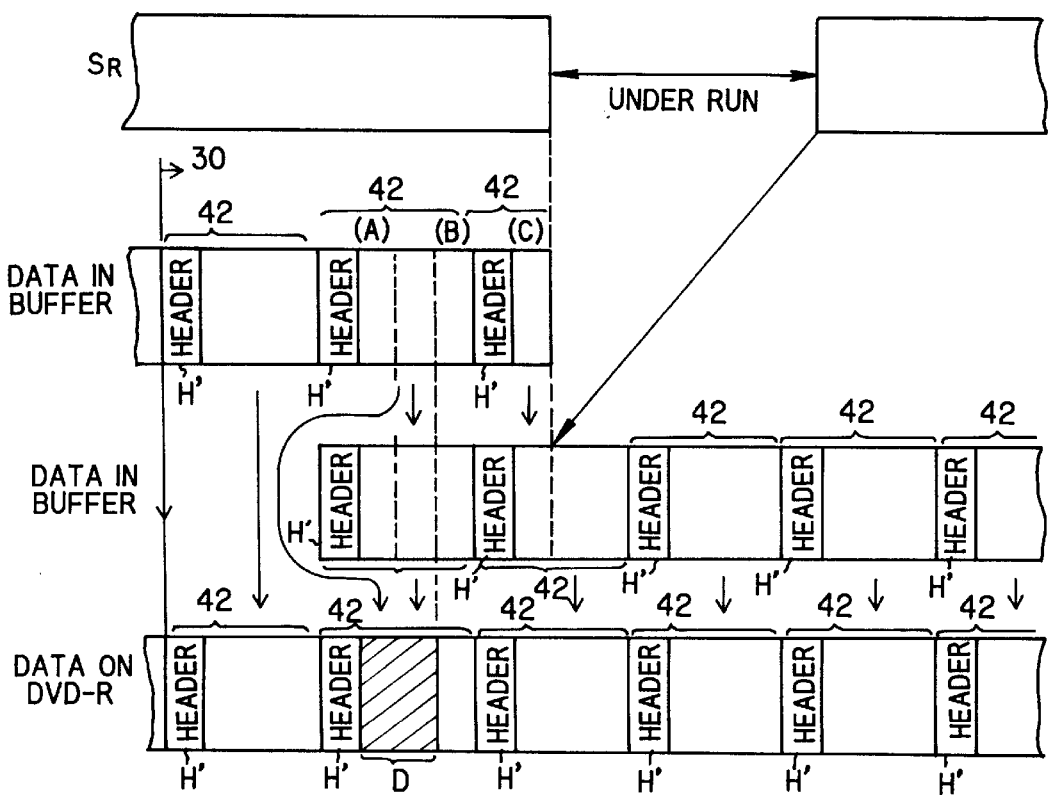
FIG. 5B is a diagram showing a change in the state of the data during the information recording operation in the embodiment.

A recording operation for the record information in the embodiment is explained with reference to FIGS. 4 to 5B. FIG. 4 is a flow chart showing the recording operation for the record information in the embodiment, which is performed mainly by the processor 8. FIG. 5A shows a transition of the data amount of the record information corresponding to the record information signal $S_R$ in the buffer memory 10 during the recording operation shown in FIG. 4. FIG. 5B shows a change in the state of the data during the recording operation shown in FIG. 4.

In FIG. 4, at first, when the information recording apparatus S is started, the record information signal $S_R$ is received from the host computer 14 through the interface 13, and is temporarily stored into the buffer memory 10 in the encoder 9 (step S1, as indicated by a portion P1 of the graph in FIG. 5A). Then, when the buffer memory 10 is filled with the record information signal $S_R$, the processor 8 transmits a data transfer stopping command signal $S_S$ (which indicates the aforementioned data transfer stopping command to request for temporarily stopping the data transfer) to the host computer 14, and the processor 8 also transmits the buffer control signal $S_C$ to the buffer memory 10 so that the encoder 9 generates the encode signal $S_{RE}$ on the basis of the record information signal $S_R$ stored in the buffer memory 10. Then, it is started to record the encode signal $S_{RE}$ onto the DVD-R 1 by the power control circuit 11, the laser drive circuit 12, the pick-up 2 and so on (step S2). Next, a UR flag in the processor 8, which indicates that the condition of the buffer memory 10 becomes the under run condition, is initialized i.e., reset to "0" (step S3). At this time, when recording is started at the step S2, the data amount in the buffer memory 10 gradually decreases (as indicated by a portion P2 of the graph in FIG. 5A).

Next, the data amount in the buffer memory 10 is checked by the processor 8 while the output of the record information signal $S_R$ from the buffer memory 10 is continued (step S4). After that, it is judged by the processor 8 whether the UR flag is "1" (i.e., the buffer memory 10 is in the under run condition) and the data amount in the buffer memory 10 is not at the full level (i.e., the buffer memory 10 is not filled with the record information signal $S_R$) (step S5).

At the step S5, since the UR flag is not "1" in the present occasion (step S5: NO), it is nextly judged whether or not the data amount in the buffer memory 10 is more than a level A set in advance (step S6). This level A corresponds to the data amount of the buffer memory 10, at which a data transfer request command signal $S_Q$ indicating the aforementioned data transfer request command to request for transferring the data in the next segment from the host computer 14 is to be outputted from the processor 8 to the host computer 14 (as indicated by the level A in FIG. 5A). Then, if the data amount is not more than the level A (step S6: NO, as indicated by a portion P3 of the graph in FIG. 5A), the data transfer request command signal $S_Q$ is transmitted from the processor 8 to the host computer 14 (step S7). In response to this, as the record information signal $S_R$ is transmitted from the host computer 14, the data amount in the buffer memory 10 gradually increases (as indicated by a portion P4 of the graph in FIG. 5A).

At this stage, when it is stopped to transfer the record information signal $S_R$ from the host computer 14, since the recording operation onto the DVD-R 1 is still continued, the data amount in the buffer memory 10 gradually decreases (as indicated by a portion P5 of the graph in FIG. 5A). Then, it is judged by the processor 8 whether or not the data amount in the buffer memory 10 is more than a level B set in advance, which corresponds to a standard data amount at which the buffer memory 10 is judged as the under run condition (as indicated by the level B in FIG. 5A) (step S8). Here, more concretely, in case that the ECC block 30 is constructed by 32 K bytes, the level B is set to 48 Kbytes, for example.

According to the judgment at the step S8, if it is judged that, since the record information signal $S_R$ is not still transmitted from the host computer 14, the data amount in the buffer memory 10 is not more than the level B (step S8: NO), it is concluded that the buffer memory 10 is in the under run condition (as indicated by a range of "under run" in FIG. 5A). Then, it is checked where a record position, at which the pick-up 2 is presently recording on the DVD-R 1, is positioned (step S9). Then, it is judged whether or not the record position is at a predetermined position at which recording onto the DVD-R 1 is to be temporarily stopped (step S10). In the present embodiment, this predetermined position, at which recording is to be temporarily stopped in case of the under run condition, is set in a latter half portion of the 2nd sync frame 42 from the head of the ECC block 30. Thus, in this case, it is judged whether or not the record position is positioned in a latter half portion of the 2nd sync frame 42 from the head of the ECC block 30 at the step S10. Then, if the record position is at this predetermined position (step S10: YES), recording is temporarily stopped at the latter half portion of the 2nd sync frame 42 from the head of the ECC block 30, and that the header H' indicating this 2nd sync frame 42 is stored into a RAM (Random Access Memory) in the processor 8. Further, a timer in the processor 8 not illustrated is started, and the UR flag is set to "1" (step S11).

Here, the condition of the buffer memory 10 while the process at the step S11 is executed is explained with reference to FIG. 5B. In a second top stage of FIG. 5B, it is assumed that the under run condition of the buffer memory 10 is detected when the record information signal $S_R$ is recorded into the buffer memory 10 until a point (C) in FIG. 5B (step S8: NO), the processor 8 controls the pick-up 2 etc., to temporality stop the recording operation in such a state that the encode signal $S_{RE}$ until a point (B) in the second top stage of FIG. 5B has been recorded (i.e., until the latter half portion of the 2nd sync frame 42 from the head of the ECC block 30) (step S1). At this time, on the DVD-R 1, as shown in a bottom stage of FIG. 5B, recording has been completed until a position corresponding to the point (B). On the other hand, the record information signal $S_R$, which corresponds to a range from a front half position of the 2nd sync frame 42 from the head of the ECC block 30 (e.g., the point (A) in the second top stage of FIG. 5B) to a point (C) in the second top stage of FIG. 5B, has been stored in the buffer memory 10.

In this manner, when recording is temporarily stopped (step S11), it is judged whether or not the timer of the processor 8, which has been started at the step S11, indicates a standard time C to judge a hung up condition of the host computer 14 (i.e. a trouble condition in which the host computer 14 cannot transmit the record information signal $S_R$ due to a failure of the CPU etc. thereof) (step S12). If the timer does not indicates the standard time C yet (step S12: NO), the operation flow returns to the step S4, since there is such a possibility that transferring the record information signal $S_R$ is re-started from the host computer 14, so as to check the data amount in the buffer memory 10. Next, if transferring the record information signal $S_R$ is not re-started from the host computer 14 yet, since the judgment result at the step S5 becomes "YES", the operation flow branches to the step S12, so as to check the value of the timer again. Then, if transferring the record information signal $S_R$ from the host computer 14 is not re-started until the value of the timer reaches the value C (step S12: YES), since the possibility that the host computer 14 is in the hung up condition is high, an error signal $S_E$, which indicates that the possibility of the hung up condition is high, is transmitted to the host computer 14 (step S13), and the processes are finished.

On the other hand, after the buffer memory 10 once becomes in the under run condition, if transferring the record information signal $S_R$ from the host computer 14 is re-started before the timer becomes the value C and the buffer memory 10 is filled (as indicated by a portion P6 of the graph in FIG. 5A), since the judgment result at the step S5 becomes "NO", it is judged at the step S6 whether or not the data amount in the buffer memory 10 is more than the level A. In the present occasion, since the buffer memory 10 is filled (step S6: YES), it is judged whether or not the UR flag is set to "1" at the step S14. In case that the data amount is recovered after the buffer memory 10 is once in the under run condition, since the UR flag is set to "1" (step S14: YES), the UR flag is initialized i.e. set to "0" (step S17). Then, when recording is re-started, the header H' of the sync frame 42 where recording has been stopped, which is stored in the RAM of the processor 8 (i.e., the header H' of the 2nd sync frame 42 from the head of the ECC block 30) is read out from the RAM. Further, it is judged whether or not the record position of the pick-up 2 is at a connect position, which is the head position of the 2nd sync frame 42 from the head of the ECC block 30, so as to re-start recording from the head of the sync frame 42, which is read out from the RAM including a stopped position where recording has been temporarily stopped, in correspondence with the stopped position (as indicated by the point (B) in FIG. 5B) (step S18). If the record position is at the connect position (step S18: YES), recording is re-started as it is (step S20). If the record position is not at the connect position (step S18: NO), the pick-up 2 is moved to the head position (i.e. the connect position) of the sync frame 42 (step S19), and recording is re-started (step S20, as indicated by a portion P7 of the graph in FIG. 5A).

At this time, when recording is re-started at the step S20, one series of the record information signal $S_R$ is constructed by adding the latter half portion of the record information signal $S_R$ after re-starting the transmission from the host computer 14, with respect to the portion of the record information signal $S_R$, which remains in the buffer memory 10 at the time of temporarily stopping recording (i.e. the portion of the record information signal $S_R$ corresponding to the area from the point (A) to the point (C) in the second top stage of FIG. 5B, which is stored in the buffer memory 10). Then, the encode signal $S_{RE}$ corresponding to this one series of the record information signal $S_R$ is re-recorded from the head of the 2nd sync frame 42 from the head of the ECC block 30 (as indicated by the third top stage of FIG. 5B). At this time, on the DVD-R 1, the encode signal $S_{RE}$ is overwritten from the head of the 2nd sync frame 42 (from the head of the ECC block 30) to the position corresponding to the point (B) as shown in the bottom stage of FIG. 5B. Thus, the data in this overwritten portion (i.e. a data destroyed area D in the bottom stage of FIG. 5B) is destroyed. However, since the data destroyed area D is within one sync frame 42, it is within an error correctable area for the error correction at the time of reproducing the record information, so that the erroneous reproduction is not caused at the time of reproduction.

At the step S20, when recording is re-started, the operation flow returns to the step S4, so as to check the data amount in the buffer memory 10 and prepare for the next under run condition, again.

On the other hand, according to the judgment at the step S6, even if the data amount in the buffer memory 10 is less than the level A (step S6: NO), by the transmission of the record information signal $S_R$ from the host computer 14 in response to the data transfer requesting command signal $S_Q$ (step S7), if the data amount in the buffer memory 10 becomes more than the level B (step S8: YES), the operation flow branches to the step S14, so as to perform recording again.

Further, according to the judgment at the step S10, if the record position of the pick-up 2 is not at the predetermined position (i. e., not in the latter half portion of the 2nd sync frame 42 from the head of the ECC block 30) although the buffer memory 10 is in the under run condition (step S10: NO), the operation flow branches to the step S14 so as to continue recording until the record position reaches this predetermined position.

On the other hand, at the step S14, if the under run condition is not generated or is dissolved after it is once generated, since the UR flag is not set to "1" (step S14: NO), recording the encode signal $S_{RE}$ is continued (step S15). Then, it is judged whether or not the transfer of the record information signal $S_R$ is all ended in accordance with an end command etc. for the record information signal $S_R$ from the host computer 14 (step S16). If it is all ended (step S16: YES), the recording operation is ended. If the transfer of the record information signal $S_R$ is not all ended (step S16: NO), the operation flow returns to the step S4 so as to continue the recording operation, check the data amount in the buffer memory 10 and prepare for the next under run condition.

Incidentally, in the flow chart of FIG. 4, in case of the normal condition i.e., in case that the under run condition is not generated, the processes at the steps S1 to S6 (or S8), S14 to S16 are repeated.

As explained above, according to the recording operation in the embodiment, in case that the data amount in the buffer memory 10 becomes less than the predetermined level B, recording is temporarily stopped in the latter half portion of the 2nd sync frame 42 from the head of the ECC block 30, and recording is re-started from the head of the 2nd sync frame 42 from the head of the ECC block 30 when the data amount recovers to be more than the predetermined level B (or the level A). Accordingly, even if the data amount in the buffer memory 10 decreases by the generation of the under run condition in the record information signal $S_R$, it is possible to maintain the continuity of the data at the time of reproducing the encode signal $S_{RE}$ after recording the DVD-R 1, so that a precise reproduction can be performed.

Since the overwritten portion of the encode signal $S_{RE}$ is within one sync frame 42, it is possible to easily perform the error correction at the time of reproduction.

Further, since the record information signal $S_R$ is outputted from the host computer 14, even if the record information signal $S_R$ is ceased due to the failure of the host computer 14 etc. and the generation of the encode signal $S_{RE}$ is ceased in due course, the encode signal $S_{RE}$ can be continuously recorded on the DVD-R 1.

Furthermore, since the processor 8 transmits the error signal $S_E$ to the host computer 14 when the data amount in the buffer memory 10 remains less than the level B after recording the encode signal $S_{RE}$ is stopped, it is possible for the host computer 14 to recognize that it is in the error condition.

In the above explained embodiment, recording is temporarily stopped within the 2nd sync frame 42 from the head of the ECC block 30, and recording is re-started from the head of this sync frame 42. However, the present invention is not limited to this. For example, recording may be re-started while overwriting from another sync frame 42 which is prior in time sequence, by a data amount corresponding to a plurality of sync frames, to one sync frame 42 at which recording has been stopped, as long as it is within the area correctable by the error correction capability at the time of reproducing the ECC block 30. In this case, by storing the sync frame 42, which is being recorded at a time when recording is temporarily stopped, into the RAM of the processor 8, and by re-starting the recording operation while overwriting from the sync frame 42 which is prior in time sequence, by the data amount corresponding to a plurality of sync frames, to the stored sync frame 42, or overwriting from the stored sync frame 42 itself, the recording operation can be temporarily stopped at any sync frame 42 within the area correctable by the error correction capability at the time of reproducing the ECC block 30.

Further, in the above explained embodiment, after the record information signal $S_R$ is temporarily stored in the buffer memory 10, the record information signal $S_R$ is read out so that the generation process of the ECC block 30, the interleave process and so on are applied to this read out record information signal $S_R$. However, the present invention is not limited to this. For example, after applying the generation process of the ECC block 30, the interleave process and so on to the record information signal $S_R$, the processed data i.e., the encode signal $S_{RE}$ may be temporarily stored in the buffer memory 10, and then, the stored data may be recorded onto the DVD-R 1.

In the above explained embodiment, the case where the record information is recorded onto the DVD-R 1 has been explained. However, the present invention is not limited to this. For example, as long as the record information, which is divided into recording units such as sync frames or the like, is to be recorded, the present invention can be applied to a hard disc apparatus, a flexible disc apparatus and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording method comprising:
    a buffering process for temporarily storing information, which is inputted from the external and is to be recorded, in a buffer memory;
    a generating process for reading out the temporarily stored information from said buffer memory, and applying a predetermined signal process onto the read out information to generate processed information comprising a plurality of record units;
    a recording process of recording the processed information onto an information record medium;
    a detecting process of detecting a storage amount of the temporarily stored information in said buffer memory;

a stop controlling process of controlling said recording process to stop recording the processed information within a presently-recorded record unit among the record units, which includes the processed information which is being recorded by said recording process, when the detected storage amount becomes less than a predetermined value; and a re-start controlling process of controlling said recording process to re-start recording the processed information onto said information record medium from one of the record units, which includes the processed information to be recorded prior in time sequence to said presently-recorded record unit, or which is identical with said presently-recorded record unit, when the detected storage amount becomes more than the predetermined value.

2. An information recording method according to claim 1, wherein said stop controlling process includes a record unit storing process of storing the presently-recorded record unit, and said re-start controlling process controls said recording process to re-start recording the processed information from one of the record units, which includes the processed information to be recorded prior in time sequence to said presently-recorded record unit stored by said record unit storing process, or which is identical with said presently-recorded record unit stored by said record unit storing process.

3. An information recording method according to claim 1, wherein the processed information is divided into a plurality of error correction units which are set in advance, said stop controlling process controls said recording process to stop recording the processed information within a second record unit from a head of each of the error correction units among the record units included in each of the error correction units, as said presently-recorded record unit, and said re-start controlling process controls said recording process to re-start recording the processed information onto said information record medium from a head of said presently-recorded record unit.

4. An information recording method according to claim 1, wherein the information is inputted into said buffer memory from an external computer apparatus.

5. An information recording method according to claim 4, wherein said stop controlling process includes an error signal transmitting process of transmitting an error signal, which indicates an error condition in said external computer apparatus, to said external computer apparatus when the detected storage amount remains less than the predetermined value after said recording process stops recording the processed information.

6. An information recording method according to claim 4, further comprising a stop command outputting process of outputting to said external computer apparatus a data transfer stop command to stop a transmission of the information to said buffer memory, when the detected storage amount becomes a predetermined full level of said buffer memory.

7. An information recording method according to claim 4, further comprising a request command outputting process of outputting to said external computer apparatus a data transfer request command to request a transmission of the information to said buffer memory, when the detected storage amount becomes a predetermined storable level of said buffer memory.

8. An information recording apparatus comprising:

a buffer memory for temporarily storing information, which is inputted from the external and is to be recorded;

a generating device for reading out the temporarily stored information from said buffer memory, and applying a predetermined signal process onto the read out information to generate processed information comprising a plurality of record units;

a recording device for recording the processed information onto an information record medium;

a detecting device for detecting a storage amount of the temporarily stored information in said buffer memory;

a stop controlling device for controlling said recording device to stop recording the processed information within a presently-recorded record unit among the record units, which includes the processed information which is being recorded by said recording device, when the detected storage amount becomes less than a predetermined value; and a re-start controlling device for controlling said recording device to re-start recording the processed information onto said information record medium from one of the record units, which includes the processed information to be recorded prior in time sequence to said presently-recorded record unit, or which is identical with said presently-recorded record unit, when the detected storage amount becomes more than the predetermined value.

9. An information recording apparatus according to claim 8, wherein said stop controlling device includes a record unit storing device for storing the presently-recorded record unit, and said re-start controlling device controls said recording device to re-start recording the processed information from one of the record units, which includes the processed information to be recorded prior in time sequence to said presently-recorded record unit stored by said record unit storing device, or which is identical with said presently-recorded record unit stored by said record unit storing device.

10. An information recording apparatus according to claim 8, wherein the processed information is divided into a plurality of error correction units which are set in advance, said stop controlling device controls said recording device to stop recording the processed information within a second record unit from a head of each of the error correction units among the record units included in each of the error correction units, as said presently-recorded record unit, and said re-start controlling device controls said recording device to re-start recording the processed information onto said information record medium from a head of said presently-recorded record unit.

11. An information recording apparatus according to claim 8, wherein the information is inputted into said buffer memory from an external computer apparatus.

12. An information recording apparatus according to claim 11, wherein said stop controlling device includes an error signal transmitting device for transmitting an error signal, which indicates an error condition in said external computer apparatus, to said external computer apparatus when the detected storage amount remains less than the predetermined value after said recording device stops recording the processed information.

13. An information recording apparatus according to claim 11, further comprising a stop command outputting device for outputting to said external computer apparatus a data transfer stop command to stop a transmission of the information to said buffer memory, when the detected storage amount becomes a predetermined full level of said buffer memory.

14. An information recording apparatus according to claim 11, further comprising a request command outputting device for outputting to said external computer apparatus a data transfer request command to request a transmission of the information to said buffer memory, when the detected storage amount becomes a predetermined storable level of said buffer memory.

* * * * *